Feb. 28, 1939.  A. O. MICKELSON ET AL  2,149,029
MECHANISM FOR MAKING COMPOSITION SHINGLES
Filed Sept. 11, 1936
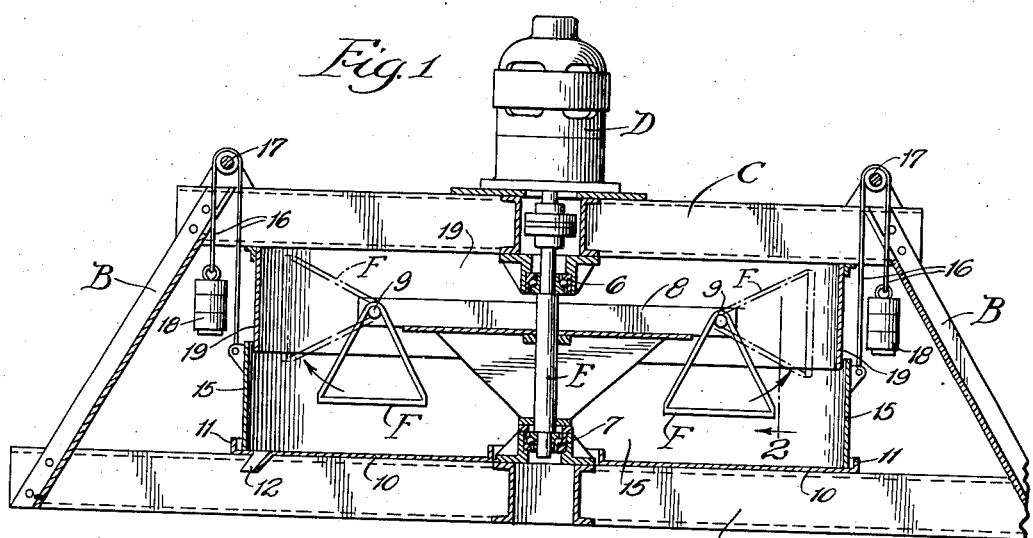
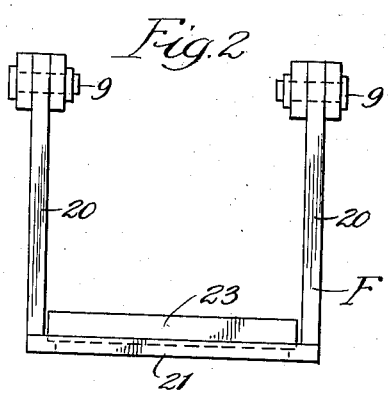
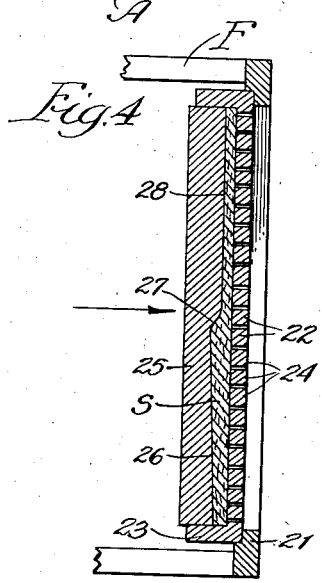
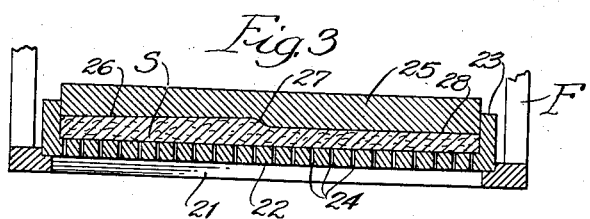
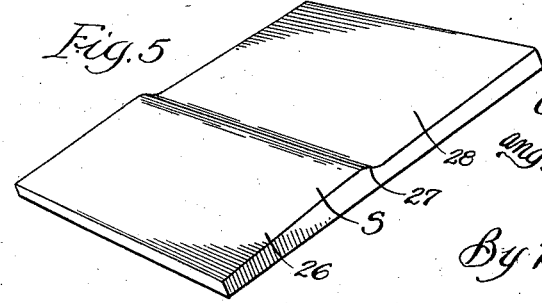
Inventors:
Alfred O. Mickelson
and Louis C. Schitto,
By Clemmnij V Clemmnij
Attys.

Patented Feb. 28, 1939

2,149,029

UNITED STATES PATENT OFFICE 2,149,029

MECHANISM FOR MAKING COMPOSITION SHINGLES

Alfred O. Mickelson and Louis C. Schillo, Chicago, Ill., assignors to Roofing Machinery Mfg. Co., Inc., Chicago, Ill., a corporation of Illinois Application September 11, 1936, Serial No. 100,370

1 Claim. (Cl. 25—43)

The present invention relates to a mechanism for treating wet plastic material in the production of composition shingles for roofs, siding for walls and similar products such as are made of semi-liquid or plastic mixtures of cement, sand, fiber and water.

It has been common practice to produce commercial asbestos cement shingles from a mixture of approximately 80% cement and 20% asbestos fiber, mixed with water into a plastic material. This wet material is spread on large sized forming plates that are butted together side by side on a long conveyor belt to thereby form a continuous sheet. At the end of the conveyor the plates, whereon the plastic material is partially set on top, are removed and stacked in a large hydraulic press. When fifty or so plates have been so stacked, pressure is applied to the pile to force out all excessive water from the shingle stock whereby to accelerate its setting. It is usual for the pile to remain under pressure until the plastic material has been set. Thereafter, with release of pressure, the slabs are removed from the press and plates, and they are then cut to size, and trimmed, drilled, or otherwise treated by various pieces of equipment. At this stage the shingles are ready for seasoning.

Such a method which is current at the present time is complicated, slow, and requires bulky and expensive equipment, also much labor for its operation. The shingles thus produced are of necessity flat surfaced, and due to the amount of equipment that must be provided it is commercially feasible to produce the shingles in only a relatively few sizes. On account of the slow setting and the numerous handling operations required, the breakage of partially finished and also finished shingles is great.

By contrast, the process and mechanism herein disclosed will greatly accelerate the setting of the plastic material, will produce shingles having sides which are flat, parallel, or otherwise, will emboss upon one or both sides of the shingles any desired design, will produce shingles in contours, as selected, will endow the finished shingle with greater strength, will permit the use of less expensive cement mixtures, will produce finished shingles in one handling, will eliminate all extra trimming and drilling operations, will dispense with the use of expensive equipment and also of skilled labor for the operation thereof, and will reduce very largely the breakage of slabs subsequent to the setting operations.

It is with objects and purposes such as these that our present invention is concerned. As a suggestive embodiment of mechanism which may be constructed to operate according to this invention, we have shown in the drawing a certain exemplification thereof in the manner following:

Figure 1 is a central, vertical section through the mechanism in its entirety;

Fig. 2 is an enlarged detail in elevation of one of the slings as it appears from the position indicated by line 2 of Fig. 1;

Fig. 3 is an enlarged detail in section through a sling frame in which is supported a covered form containing wet plastic material ready for processing;

Fig. 4 which is a view similar to Fig. 3 shows the form as it appears during processing of the plastic material therein; and Fig. 5 is a view in perspective of one type or design of shingle that may be produced according to this invention.

As a suggestive form of mechanism in which our invention may be embodied we have shown in Fig. 1 a base A from whose edges rise posts B to support an upper framework C on which is mounted a motor D in connection with a vertical shaft E. As by means of anti-friction bearings 6 and 7 the shaft is rotatably supported at upper and lower points between which are radially extended a plurality of pairs of arms 8, eight being a convenient number. Suspended at the end of each pair of arms is a sling F, pivotally carried upon pins 9 whose axes are transverse to a radius extending centrally between each pair of arms. The shaft and arms carried thereby form the rotor of the present machine. With operation of the motor the rotor is turned thereby causing the several slings to swing outwardly as indicated by the dotted lines in Fig. 1.

Upon the base is supported a floor 10 surrounded by an upturned marginal flange 11, there being one or more drain openings 12 through the floor. Close to the inside of the floor margin is a well 15 providing an enclosure through 360°. As by means of cables 16 extending from this wall over sheaves 17 to counterweights 18, the wall may be raised from and held suspended over the floor, permitting access to the several slings which are normally enclosed. A second wall 19 above and to the inside of the first wall may also be utilized, if desired, the two walls being thereby disposed in telescopic relation. This upper wall which is stationary may be supported from the framework above the base.

Each sling may comprise a pair of spaced brackets 20 of generally triangular shape supporting between them an open frame 21 which provides a seat for a shallow pan-like form 22.

As shown, each form is surrounded by upturned marginal flanges 23 adapted to retain a thin slab of composition material. The pan bottom is rendered foraminous through the provision of a plurality of small openings 24—too small for escape of the composition material, yet large enough for the passage of water therethrough. A flat cover 25 may be used with each form, its size being such as to adapt it to fit freely within the marginal flanges thereof so as to rest directly upon the plastic material therewithin.

In operation, wet or semi-liquid plastic material is placed in each form to which the cover is then added. The filled forms are then fitted into the slings, the movable wall is lowered to the floor, and operation of the rotor is started. As the speed increases the several slings are swung outwardly through substantially 90° (see Fig. 4). The centrifugal force created by high speed operation, plus the weight of the plastic material and cover, will compress the mixture, forcing out all excessive water and causing the mixture to set almost instantly. The amount of pressure necessary to drive out all excessive water from the mixture and effect a good setting will depend upon the mixture itself.

The amount of pressure obtainable by the action of centrifugal force can be determined by actual calculations. The physical facts are expressed as follows:

$$F = \frac{WV^2}{GR}$$

F—Centrifugal force in pounds.
W—Weight of revolving body, in pounds.
V—Velocity of revolving body in feet per seconds.
G—Acceleration due to gravity.
R—Radius of gyration.

It can be seen from the above that an almost unlimited amount of pressure can be obtained, the only limiting factor being the physical strength of the material the machine is constructed from.

After the apparatus has been running long enough to obtain the desired pressure and permit the setting of the mixture, the machine is stopped. The hardened shingles are emptied from the forms and stacked up for curing. New batches are filled in the forms and placed in the machine and the process repeated.

By taking advantage of the action of centrifugal force more homogeneous and consequently much stronger shingles are produced. This can readily be seen from the fact that substantially all particles within the mixtures of the shingles are aligned through being forced in the same direction towards the same side with equal pressure. Due to the fact that equal pressure is created in the same direction on every minute particle, the particles will unite, set more firmly together, and effect perfect bond.

Besides those already touched upon, there are numerous other advantages. First of all, our mechanism and process are applicable to the production of slabs, siding and other composition products having a sheet-like form, adapted for use on roofs, walls and other places. The plastic material or mixture is initially wet and in a semi-liquid condition with cement, sand, asbestos fibre and water as the usual constituents. Also, the contour, design and shape of the finished product is determined by the form and cover that is used. The opposite surfaces of the shingle may or may not be flat, parallel, plain, etc., depending upon what is wanted. For example, we may use a stepped cover as illustrated to produce a shingle S having upon one surface a sloping portion 26 separated by a shoulder 27 from a flat portion 28 that is parallel with the opposite surface of the product. The variations thus attainable are without limit. Again, certain details of the machine may be variously modified while still retaining the principles of our invention. For example, the rotor, as shown, revolves about a vertical axis; it might with nearly equal advantage rotate about an axis which is horizontal or otherwise disposed. With these considerations in mind we have used herein convenient terms such as "shingle" to designate the various products that may be made by the mechanism and process of our invention; and have illustrated and described by way of example a machine with a vertical axis for the rotor and a shingle having a stepped-tapered surface, but with no thought or intention that the machine or shingle need have this precise arrangement or form.

We claim:

In a mechanism for accelerating the setting of wet plastic material, the combination of a rotor, a sling suspended from the rotor adapted to rotate therewith and pivoted at a point in a manner to swing outwardly therefrom, an open frame seat forming the sling bottom, said open frame seat having recessed marginal edges on its upper side, a rimmed foraminous form receivable at its margin within the recessed marginal edges of the open frame seat, said form adapted to retain a quantity of plastic material while permitting escape of excessive moisture therefrom and through and beyond the bottom of the sling in response to a centrifugal force consequent upon operation of the rotor, and a material moulding element loosely fitted within the rimmed form to rest upon the material and to be freely movable toward the bottom thereof upon changes in angular positions of the form upon rotation of the sling to press with force upn the plastic material therewithin, said form, plastic material, and material moulding element all arranged below the said pivot point when the machine is at rest, whereby the said sling bottom will swing outwardly under the influence of centrifugal force, a telescoping shroud arranged about the rotor and sling, said shroud comprising two cylindrical sections one of which is counterpoised to facilitate its telescopic movement whereby the loading of the sling may be effected and the water removed from the material to be molded effectively baffled, and a drain arrangement associated with said shroud.

ALFRED O. MICKELSON.
LOUIS C. SCHILLO.